US012737432B2

(12) United States Patent
Swift et al.

(10) Patent No.: US 12,737,432 B2
(45) Date of Patent: Sep. 15, 2026

(54) HYPOTHETICAL CONFIGURATION ANALYSIS

(71) Applicant: INTERNATIONAL BUSINESS MACHINES CORPORATION, Armonk, NY (US)

(72) Inventors: Mary Diane Swift, Rochester, NY (US); Irene Lizeth Manotas Gutiérrez, White Plains, NY (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 18/512,126

(22) Filed: Nov. 17, 2023

(65) Prior Publication Data

US 2025/0165557 A1 May 22, 2025

(51) Int. Cl.
*G06F 17/18* (2006.01)

(52) U.S. Cl.
CPC .................................... *G06F 17/18* (2013.01)

(58) Field of Classification Search
CPC ....................................................... G06F 17/18
USPC .......................................................... 702/179
See application file for complete search history.

(56) References Cited

U.S. PATENT DOCUMENTS 7,596,518 B2 * 9/2009 Rappaport ......... G06Q 10/0875 705/29
8,296,424 B2 * 10/2012 Malloy ................. H04L 41/145 709/224
8,315,960 B2 * 11/2012 Chen ........................ G06N 7/01 381/396
8,494,806 B2 * 7/2013 Kato .................. G06F 11/3452 702/182
9,448,832 B2 * 9/2016 Du ............................ G06F 9/50
11,544,582 B2 * 1/2023 Suryakantha .......... G06N 20/00
11,809,966 B2 * 11/2023 Chen ................... G06F 18/2148
2004/0243548 A1 * 12/2004 Hulten ............... G06F 16/3346
(Continued)

OTHER PUBLICATIONS

Akhtar, "An overview of some network modeling, simulation and performance analysis tools." IEEE Xplore, 1997, pp. 344-348.
(Continued)

*Primary Examiner* — Zhen Y Wu
(74) *Attorney, Agent, or Firm* — Samuel A. Waldbaum

(57) ABSTRACT

An embodiment for dynamically tuning system configuration settings across multiple systems using hypothetical configuration analysis. The embodiment may gather input data for a target system, the input data including configuration settings data, a series of configuration setting parameters, and telemetry data. The embodiment may generate, from the input data, a machine learning model configured to process network data and the configuration settings data from the target system. The embodiment may determine dependencies between a given parameter from the series of configuration setting parameters and a given resource from a series of resources using the generated machine learning model. The embodiment may further predict, using the generated machine learning model, and based on the determined dependencies, performance outcomes under a tuneable range of the series of configuration setting parameters. The embodiment may generalize the generated machine learning model across a plurality of secondary systems.

17 Claims, 4 Drawing Sheets

(56) References Cited

U.S. PATENT DOCUMENTS

| | | | | |
|---|---|---|---|---|
| 2009/0183028 | A1* | 7/2009 | Arnold | G06Q 10/06<br>714/16 |
| 2009/0204561 | A1* | 8/2009 | Sabato | G06N 5/02<br>706/47 |
| 2010/0131440 | A1* | 5/2010 | Chen | G06F 9/44505<br>706/15 |
| 2012/0310618 | A1* | 12/2012 | B'Far | G06F 11/3447<br>703/13 |
| 2012/0310870 | A1* | 12/2012 | Caves | G06F 11/2247<br>706/14 |
| 2014/0156557 | A1* | 6/2014 | Zeng | G06Q 10/0631<br>705/348 |
| 2014/0330536 | A1* | 11/2014 | Chen | G06F 9/46<br>702/181 |
| 2016/0380908 | A1* | 12/2016 | Larsson | H04L 67/10<br>709/226 |
| 2020/0073788 | A1* | 3/2020 | Saha | G06F 11/3688 |
| 2020/0356838 | A1* | 11/2020 | Selvakumar | G06N 3/0442 |
| 2021/0012239 | A1* | 1/2021 | Arzani | H04L 43/50 |
| 2021/0065033 | A1* | 3/2021 | Kunde | G06N 20/00 |
| 2022/0207388 | A1* | 6/2022 | Thakkar | G06N 5/04 |
| 2022/0215013 | A1* | 7/2022 | Mercier | G06N 5/04 |
| 2024/0265273 | A1* | 8/2024 | Sun | G06N 5/022 |
| 2025/0094299 | A1* | 3/2025 | Rajagopal | G06F 11/2247 |

OTHER PUBLICATIONS

Hsu et al. "Performance of mobile ad hoc networking routing protocols in realistic scenarios." IEEE Xplore, Nov. 2003, 7 Pages. https://www.researchgate.net/publication/4070829_Performance_of_mobile_ad_hoc_networking_routing_protocols_in_realistic_scenarios.

Siraj, et al., "Network Simulation Tools Survey", International Journal of Advanced Research in Computer and Communication Engineering, vol. 1, Issue 4, Jun. 2012, 10 Pages.

Soles et al., "Creating a cost-effective air-to-ground network simulation environment." Proceedings of the IEEE SoutheastCon 2015, Apr. 9-12, 2015, 5 Pages.

Wang, et al., "Efficient Network Security Policy Enforcement With Policy Space Analysis", IEEE/ACM Transactions on Networking, vol. 24., No. 5, Oct. 2016, pp. 2926-2938.

Zhao, et al., "Performance of Container Networking Technologies", Proceedings of HotConNet'17, Aug. 25, 2017, 6 pages.

* cited by examiner

HYPOTHETICAL CONFIGURATION ANALYSIS

BACKGROUND

The present application relates generally to computer processing, and more particularly, to dynamically tuning system configuration settings across multiple systems using hypothetical configuration analysis.

Many businesses employ a variety of networks and systems to perform various tasks and functions. Typically, there are highly adjustable configurations for these employed networks and systems, including applicable variables that can take on a range of values and have unique dependencies. Businesses employing multiple systems and networks constantly strive to identify and utilize optimal configurations settings to optimize performance and resource utilization.

SUMMARY

According to one embodiment, a method, computer system, and computer program product for dynamically tuning system configuration settings across multiple systems using hypothetical configuration analysis is provided. The embodiment may include gathering input data for a target system, the input data including configuration settings data, a series of configuration setting parameters, and telemetry data. The embodiment may also include generating, from the input data, a machine learning model configured to process network data and the configuration settings data from the target system. The embodiment may further include determining dependencies between a given parameter from the series of configuration setting parameters and a given resource from a series of resources using the generated machine learning model. The embodiment may also include predicting, using the generated machine learning model, and based on the determined dependencies, performance outcomes under a tuneable range of the series of configuration setting parameters. The embodiment may further include generalizing the machine learning model across a plurality of secondary systems.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
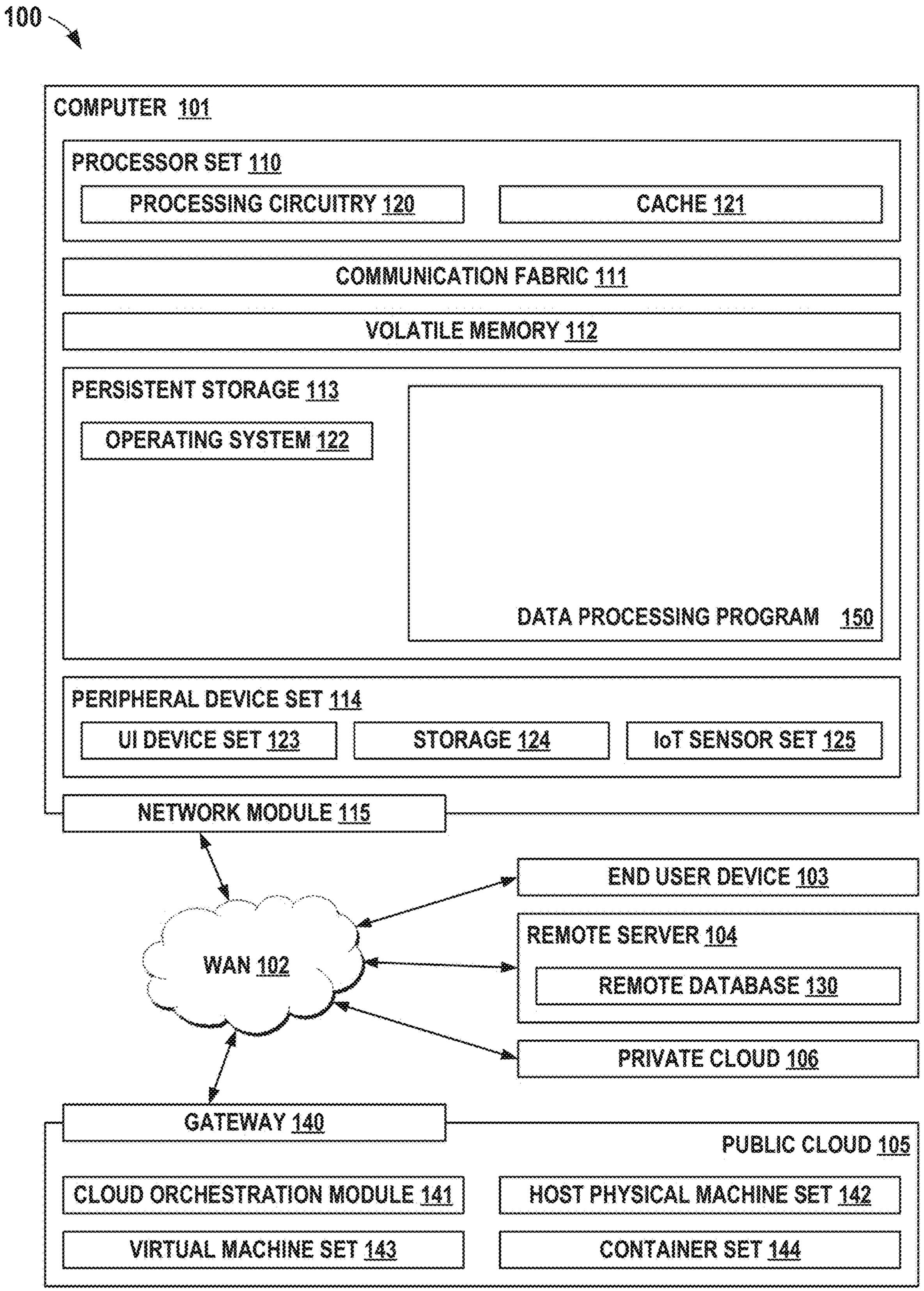
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to improved dynamic tuning of system configuration settings across multiple systems using hypothetical configuration analysis The following described exemplary embodiments provide a system, method, and program product to, among other things, gather input data for a target system, the input data including configuration settings data, a series of configuration setting parameters, and telemetry data, generate, from the input data, a machine learning model configured to process network data and the configuration settings data from the target system, determine dependencies between a given parameter from the series of configuration setting parameters and a given resource from a series of resources using the generated machine learning model, predict, using the generated machine learning model, and based on the determined dependencies, performance outcomes under a tuneable range of the series of configuration setting parameters, and generalize the machine learning model across a plurality of secondary systems.

As previously described, many businesses employ a variety of networks and systems to perform various tasks and functions. Typically, there are highly adjustable configurations for these employed networks and systems, including applicable variables that can take on a range of values and have unique dependencies. Businesses employing multiple systems and networks constantly strive to identify and utilize optimal configurations settings to optimize performance and resource utilization.

However, there are many challenges faced by businesses in trying to utilize optimal configuration settings, especially in environments with multiple systems or networks. For example, when attempting to optimize configuration settings, adjusting or changing a value for a given variable may result in a gain in one part of an employed system, but simultaneously lead to performance degradation in a different part of the employed system. Misjudging parameters can lead to inefficient resource utilization and undesirable decreases in performance. In some instances, misjudging parameters for configuration settings can lead to system or network outages.

Accordingly, a method, computer system, and computer program product for dynamically tuning system configuration settings across multiple systems using hypothetical configuration analysis would be advantageous. The method, system, and computer program product may gather input data for a target system, the input data including configuration settings data, a series of configuration setting parameters, and telemetry data. The method, system, computer program product may generate, from the input data, a machine learning model configured to process network data and the configuration settings data from the target system. The method, system, computer program product may then determine dependencies between a given parameter from the series of configuration setting parameters and a given resource from a series of resources using the generated machine learning model. The method, system, computer program product may predict, using the generated machine learning model, and based on the determined dependencies, performance outcomes under a tuneable range of the series of configuration setting parameters. Thereafter, the method, system, computer program product may generalize the machine learning model across a plurality of secondary systems. In turn, the method, system, computer program product has provided for dynamically tuning system configuration settings across multiple systems using hypothetical configuration analysis by leveraging a generated machine learning model to automatically make predictions of positive or negative consequences for a range of configuration adjustments, thereby reducing the need for manual empirical testing of various configuration settings in order to home in on optimal values. Described embodiments process input data from a target system or network, combining distribution fitting, entity discourse analysis and correlation analysis to infer the level of dependency between various parameters in potential configuration settings including the effects of each parameter and configuration setting on resource consumption. Accordingly, described embodiments allow for hypothetical configuration testing that may avert negative consequences of misjudging specific parameter settings while attempting to employ optimized configuration settings. Therefore, employing the described embodiments may allow users to reduce costs associated with specific resource utilization on a given system by optimizing configuration settings having specific parameters to ensure resource utilization within a given system is desirably optimized.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as data processing program/code 150. In addition to data processing code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data processing code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data processing code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in data processing program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the data processing program 150 may be a program capable of gathering input data for a target system, the input data including configuration settings data, a series of configuration setting parameters, and telemetry data. Data processing program 150 may then generate, from the input data, a machine learning model configured to process network data and the configuration settings data from the target system. Data processing program 150 may then determine dependencies between a given parameter from the series of configuration setting parameters and a given resource from a series of resources using the generated machine learning model. Next, data processing program 150 may predict, using the generated machine learning model, and based on the determined dependencies, performance outcomes under a tuneable range of the series of configuration setting parameters. Thereafter, data processing program 150 may generalize the machine learning model across a plurality of secondary systems. In turn, the method, system, computer program product has provided for dynamically tuning system configuration settings across multiple systems using hypothetical configuration analysis by leveraging a machine learning model to automatically make predictions of positive or negative consequences for a range of configuration adjustments, thereby reducing the need for manual empirical testing of various configuration settings in order to home in on optimal values. Described embodiments process input data from a target system or network, combining distribution fitting, entity discourse analysis and correlation analysis to infer the level of dependency between various parameters in potential configuration settings including the effects of each parameter and configuration setting on resource consumption. Accordingly, described embodiments allow for hypothetical configuration testing that may avert negative consequences of misjudging specific parameter settings while attempting to employ optimized configuration settings. Therefore, employing the described embodiments may allow users to reduce costs associated with specific resource utilization on a given system by optimizing configuration settings having specific parameters to ensure resource utilization within a given system is desirably optimized.

Figure 2:
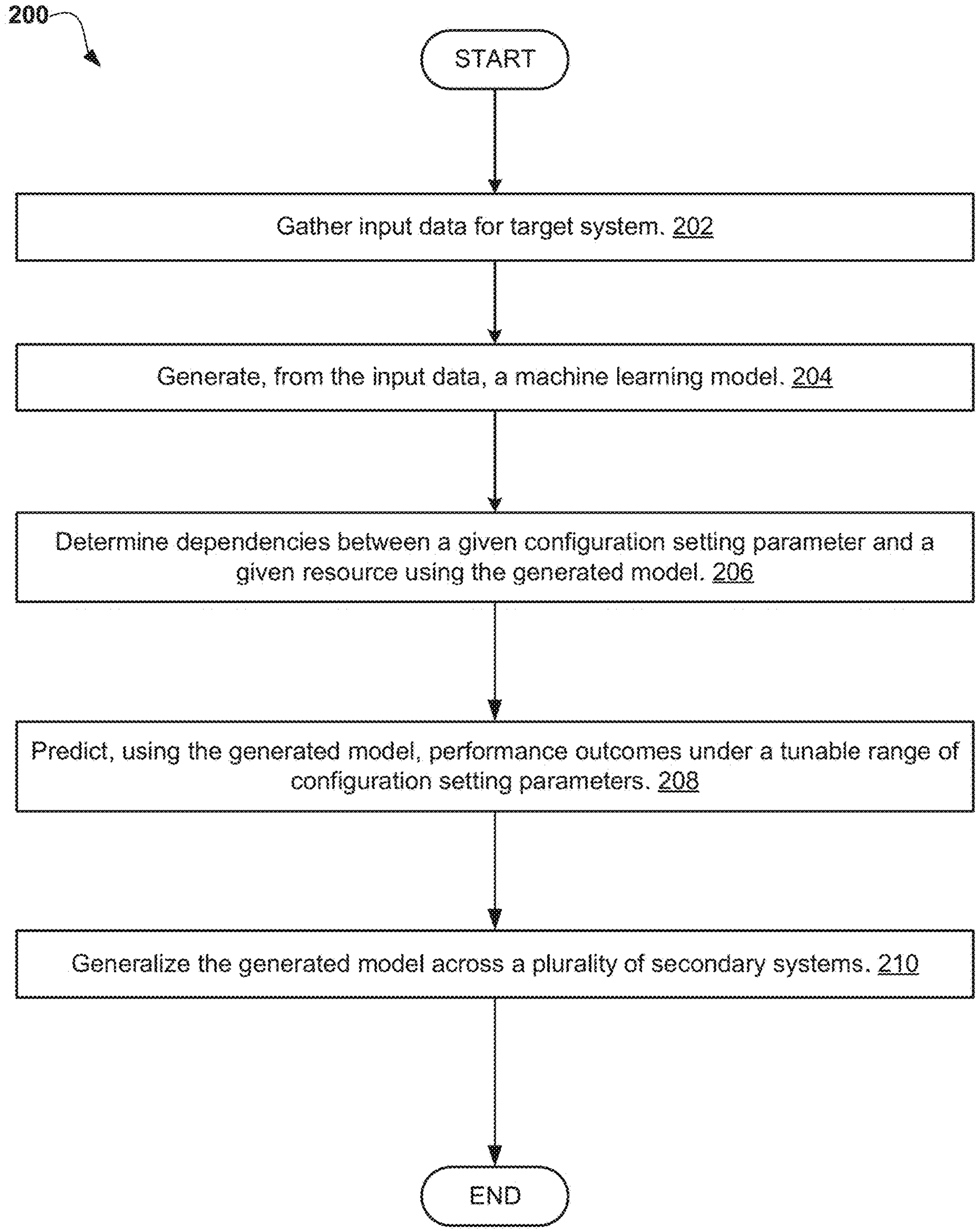
FIG. 2 illustrates an operational flowchart for an exemplary process of dynamically tuning system configuration settings across multiple systems using hypothetical configuration analysis according to at least one embodiment.

Referring now to FIG. 2, an operational flowchart for an illustrative process 200 of dynamically tuning system configuration settings across multiple systems using hypothetical configuration analysis according to at least one embodiment is provided.

At step 202, data processing program 150 may gather input data for a target system, the input data including configuration settings data, a series of configuration setting parameters, and telemetry data. In the context of this disclosure the target system may include any technological environment, network, or system within which technological services, applications, or other tools may be hosted, utilized, or otherwise leveraged. For example, an exemplary target system 'S1' may include an exemplary application 'Al' of interest hosted on an exemplary network 'N1'. In embodiments, data processing program 150 may gather the input data for the target system (associated with relevant applications as well as the networks or environments in which they are utilized) continuously over time to collect time-series data as system operations are executed. The collected time-series data, and other gathered input data may be stored within any suitable storage component accessible by data processing program 150. In embodiments, data processing program 150 may be configured to further process the gathered input data as will be described in greater detail below.

In the context of this disclosure, configuration setting data may include any data related to categorical configuration settings for the target system. For example, data processing program 150 may gather configuration setting data for an exemplary target system 'S1' by using static code analysis to determine the types of code being executed. In embodiments, data processing program 150 may further perform entity analysis of configuration settings of exemplary target system 'S1' to determine the proportion of various setting types, such as, for example, db connections, memory pools, heap etc. At this step, data processing program 150 may further gather input data related to a series of configuration setting parameters. In the context of this disclosure, the configuration setting parameters may refer to any adjustable variables or settings that may be changed by a user. For example, for target system 'S1', data processing program 150 may gather input data including configuration setting parameters for adjusting maximum concurrent connections, thread pool size, request and response size, maximum response sizes, cache settings, content delivery settings, image and media compression, session and resource cleanup policies, connection pools sizes, and any other suitable adjustable settings or variables related to the configuration settings for the target system. It should be noted that adjusting the configuration setting parameters may influence resource utilization in the exemplary target system 'S1' depending on the user-selected values for each respective configuration setting parameter.

In the context of this disclosure, the telemetry data included in the gathered input data may refer broadly to any gatherable or monitorable usage data associated with the target system. For example, data processing program 150 may gather exemplary telemetry data 'T1' associated with an exemplary target system 'S1' which is represented by an exemplary Application 'Al' being run on an exemplary network 'N1'. In embodiments, telemetry data may include usage data for monitoring performance, resource utilization, general user usage analytics, error tracking, and any other suitable and monitorable usage data. For example, data processing program 150 may gather exemplary telemetry data for exemplary Application 'Al' being run on an exemplary target system 'S1' which includes central processing unit (CPU) usage, memory usage, and disk usage data at the point of execution of a given operation performed on target system 'S1'. Typically, a user controlling an exemplary target system running an application or other type of software, will seek to optimize the configuration settings to minimize resource utilization to thereby reduce their costs associated with the target system.

As stated above, in embodiments, data processing program 150 may gather any of the input data, including the telemetry data, continuously over time to generate time-series data. In embodiments, data processing program 150 may further process the data. For example, in embodiments, for different configuration setting categories, Analysis of Variance (ANOVA) techniques may be utilized to determine if the gathered telemetry data can be drawn from the same population. In embodiments, data processing program 150 may further process gathered input data by performing various statistical computations such as, for example, computing central tendency measurements, including but not limited to, measures of location, mean, median, standard deviation, interquartile ranges, and skew to determine preliminary dependencies between changes in different configuration setting parameters and the gathered telemetry data or resource utilization of the target system 'S1'.

Figure 3:
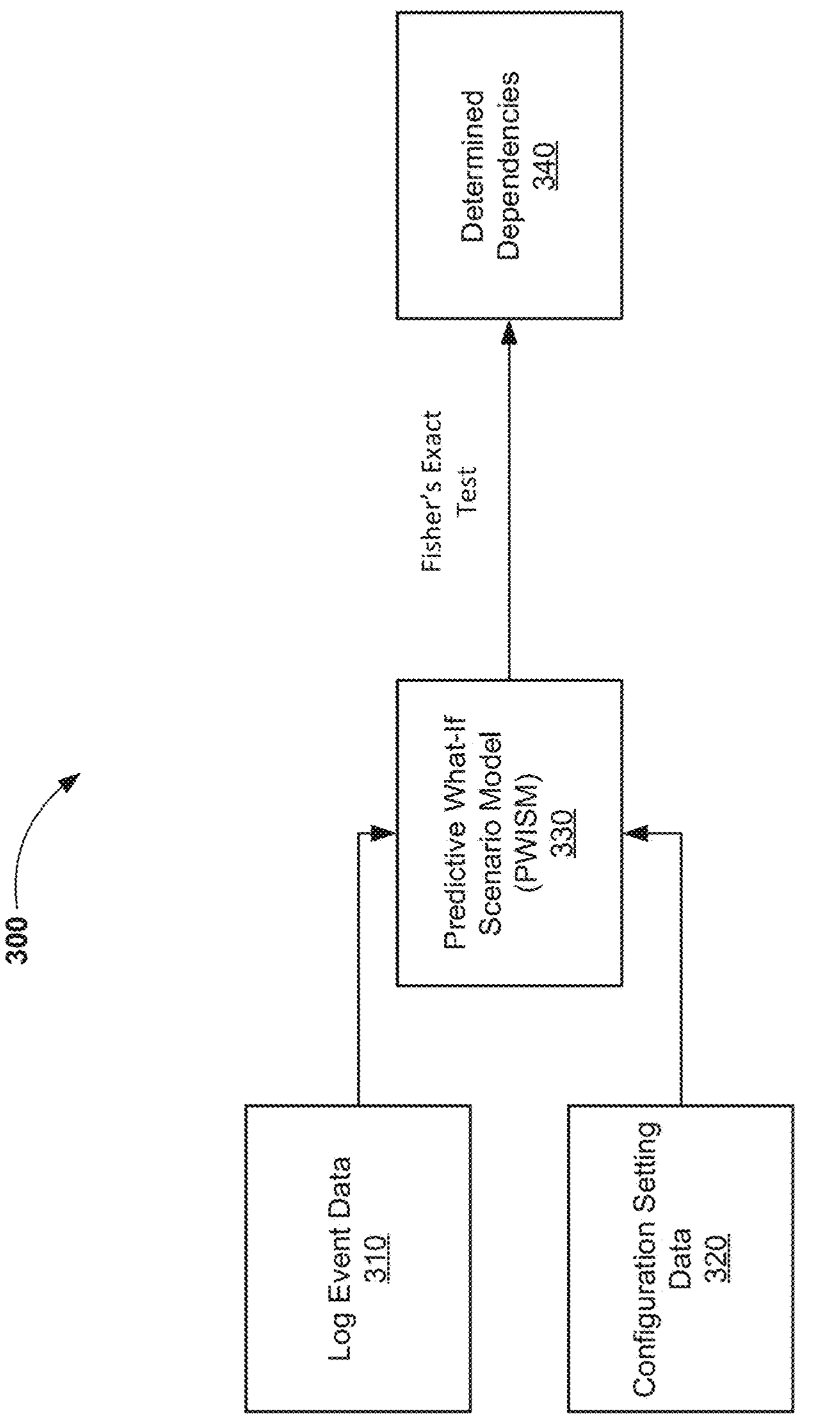
FIG. 3 illustrates an exemplary process of building a Predictive What-If Scenario Model and leveraging the model to determine dependencies according at least one embodiment.

Next, at 204, data processing program 150 may generate, from the input data, a machine learning model which processes network data and configuration settings from the target system. In embodiments, the machine learning model may be, for example, a Predictive What-If Scenario Model (PWISM) configured to process network data and the configuration settings data from the target system. FIG. 3 illustrates an exemplary process 300 of building a Predictive What-If Scenario Model and leveraging the model to determine dependencies according at least one embodiment. As shown in FIG. 3, the gathered input data is represented by log event data 310 and configuration setting data 320. In embodiments, the log even data 310 may include gathered network (target system) data related to the gathered telemetry data from step 202 corresponding to execution of various operations within the target system. In embodiments, the gathered network data in log event data 310 is time-stamped. Configuration setting data 320 may include both categorical information related to the configuration setting data as well as data related to the series of configuration setting parameters which may be adjusted by the user. By combining the data contained in log event data 310 and configuration setting data 320, a Predictive What-If Scenario Model 330 may be generated. The generated PWISM 330 may further include any additional data generated by further processing of log event data 310 and configuration setting data 320, such as, for example, the entity analysis data, ANOVA data, associated statistical data, or any other relevant or useful data (as determined by a user) generatable by processing log event data 310 or configuration setting data 320. The generated PWISM 330 may then be used to perform Fisher's exact test to identify determined dependencies 340 between configuration setting parameters and resources associated with the gathered telemetry data, as will be described in greater detail below.

At step 206, data processing program 150 may determine dependencies between a given parameter from the series of configuration setting parameters and a given resource from a series of resources using the generated machine learning model. At this step, data processing program 150 may, for example, leverage an exemplary PWISM generated using input data gathered for an associated exemplary system 'S1' to determine dependencies between a first exemplary parameter 'P1' and a given exemplary resource 'R1'. For example, data processing program 150 may leverage the generated PWISM to determine dependencies between an adjustable configuration setting parameter such as the 'maximum concurrent connections' and a given resource such as 'CPU'. Accordingly, data processing program 150 would leverage the PWISM to determine the sensitivity or dependency between adjusting the 'maximum concurrent connections' parameter and observed effects on 'CPU' resource usage. In embodiments, this sensitivity or dependency may be represented by a calculated score (generated by the PWISM) that may be normalized between 0 and 1, where a value of 0 represents no dependency or sensitivity, and larger values closer to 1 represent higher levels of sensitivity or dependency. Thus, if the PWISM calculated a score of 0.95 for the above-described example, this would indicate that adjusting the 'maximum concurrent connections' parameter would have a strong likelihood of significantly influencing the 'CPU' usage.

In embodiments, the leveraged machine learning model may determine the dependencies and calculate associated risk scores by further processing the gathered input data from step 202. For example, in embodiments, an exemplary PWISM model may collate the measures of locations and ANOVSA analysis results associated with the gathered input data contained in log event data and configuration data that are fed into the PWISM. The PWISM may then leverage these results to perform a hypothesis test, such as Fisher's Exact Test, to determine dependencies between configuration setting parameters and usage of resources contained in the gathered telemetry data.

Figure 4:
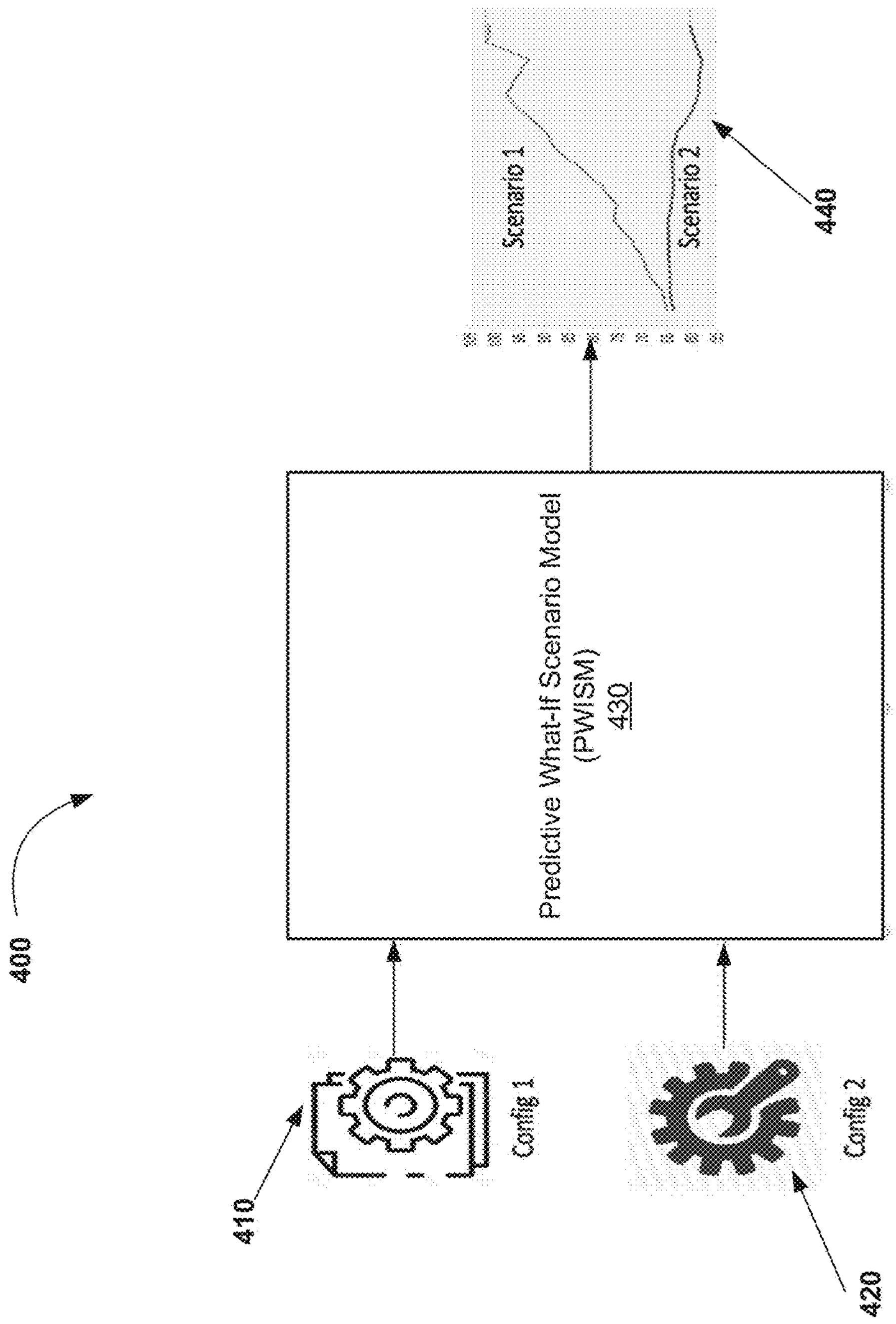
FIG. 4 illustrates an exemplary process of leveraging a Predictive What-If Scenario Model to predict performance outcomes between different configurations having differing parameters according to at least one embodiment.

Next, at 208, data processing program 150 may predict, using the generated machine learning model, and based on the determined dependencies, performance outcomes under a tuneable range of the series of configuration setting parameters. FIG. 4 illustrates an exemplary process 400 of leveraging a generated machine learning model, in this case a generated Predictive What-If Scenario Model, to predict performance outcomes between different configurations having differing parameters according to at least one embodiment. At this step, as shown in FIG. 4, data processing program 150 may leverage an exemplary PWISM 430 to determine performance outcomes 440 for a first exemplary configuration represented by 'Config 1' at 410, and a second exemplary configuration represented by 'Config 2' at 420. As shown in FIG. 4, data processing program 150 may leverage PWISM 430 to allow for comparisons of predicted outcomes between two separate configurations having different configuration setting parameter values. Thus, users of data processing program 150 may be presented with performance outcomes that indicate which configuration setting parameters will optimize for resource usage within a given target system. In embodiments, the predicted performance outcomes generated by the PWISM may be presented to a user of data processing program 150 using any suitable means or user interfaces. For example, data processing program 150 may be employed on a target system and include a user dashboard within a suitable user interface that presents the predicted outcomes, with respect to resource usage, for various configurations including different configuration setting parameter values. Additionally, data processing program 150 may be configured to depict output associated with the predicted performances using various desired formats. For example, as shown at 440, the predicted performance outcomes for exemplary configurations 410 and 420 are depicted graphically. In other embodiments, the predicted performance outcomes may be represented numerically as normalized values indicative of expected resource utilization values associated with a given configuration having specific configuration setting parameter values.

Thereafter, at 210, data processing program 150 may generalize the generated machine learning model across a plurality of secondary systems. In the context of this disclosure, 'generalize' refers to a process of data processing program 150 adapting the generated machine learning model model to one or more additional target systems or environments having previously unseen, but likely similar, data as was used by data processing program 150 to create the generated machine learning model (the gathered input data from step 202). In embodiments, data processing program 150 may be configured to repeat the previously described steps in one or more additional environments to further build upon or update the generated machine learning model. This step ultimately allows for data processing program 150 and the generated machine learning model model to be employed across multiple, systems, networks, or environments to allow for leveraging of larger volumes of data. This functionally increases the confidence of predicted outcomes generated by the machine learning model and improves its performance with regard to leveraging hypothetical configurations to optimize configuration setting parameters for minimizing resource usage. This allows data processing program 150 to more accurately recommend optimize configuration setting parameter values that may minimize cost by optimizing resource usage, but also allow users to avoid configuration setting parameters that may be expected to lead to negative outcomes. In embodiments, data processing program 150 may be configured to combine gathered data across multiple environments and present any processed data, predictions, or recommendations on similar, shared, suitable user interfaces. For example, data processing program 150 may be configured to present any outputs within an accessible user dashboard that is presented to the user via a suitable user interface.

It may be appreciated that data processing program 150 has thus provided for improved dynamic tuning of system configuration settings across multiple systems using hypothetical configuration analysis by leveraging a generated machine learning model to automatically make predictions of positive or negative consequences for a range of configuration adjustments, thereby reducing the need for manual empirical testing of various configuration settings in order to home in on optimal values. Described embodiments process input data from a target system or network, combining distribution fitting, entity discourse analysis and correlation analysis to infer the level of dependency between various parameters in potential configuration settings including the effects of each parameter and configuration setting on resource consumption. Accordingly, described embodiments allow for hypothetical configuration testing that may avert negative consequences of misjudging specific parameter settings while attempting to employ optimized configuration settings. Furthermore, employing the described embodiments may allow users to reduce costs associated with specific resource utilization on a given system by optimizing configuration settings having specific parameters to ensure resource utilization within a given system is desirably optimized.

It may be appreciated that FIGS. 2-4 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for dynamically tuning system configuration settings across multiple systems using hypothetical configuration analysis, the method comprising:

gathering input data for a target system, the input data including configuration settings data, a series of configuration setting parameters, and telemetry data;

leveraging analysis of variance (ANOVA) techniques to determine if the telemetry data may be drawn from a same population;

generating, from the input data, a machine learning model configured to process network data and the configuration settings data from the target system;

determining dependencies between a given parameter from the series of configuration setting parameters and a given resource from a series of resources using the generated machine learning model;

predicting, using the generated machine learning model, and based on the determined dependencies, performance outcomes under a tuneable range of the series of configuration setting parameters; and generalizing the generated machine learning model across a plurality of secondary systems.

2. The computer-based method of claim 1, further comprising:

performing entity analysis on the gathered input data to determine a proportion of setting types.

3. The computer-based method of claim 1, further comprising:

storing the chat history, using a chatbot backend server, within a storage component.

4. The computer-based method of claim 1, further comprising:

performing statistical computations on the gathered input data to determine preliminary dependencies between the configuration setting parameters on the telemetry data.

5. The computer-based method of claim 1, wherein determining dependencies between a given parameter from the series of configuration setting parameters and a given resource from a series of resources using the generated machine learning model further comprises:

calculating a score reflecting the dependency between the given parameter and the given resource; and normalizing the calculated score.

6. The computer-based method of claim 1, further comprising:

outputting the predicted performance outcomes to a user via a user interface.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

gathering input data for a target system, the input data including configuration settings data, a series of configuration setting parameters, and telemetry data;

leveraging analysis of variance (ANOVA) techniques to determine if the telemetry data may be drawn from a same population;

generating, from the input data, a machine learning model configured to process network data and the configuration settings data from the target system;

determining dependencies between a given parameter from the series of configuration setting parameters and a given resource from a series of resources using the generated machine learning model;

predicting, using the generated machine learning model, and based on the determined dependencies, performance outcomes under a tuneable range of the series of configuration setting parameters; and generalizing the machine learning model across a plurality of secondary systems.

8. The computer system of claim 7, performing entity analysis on the gathered input data to determine a proportion of setting types.

9. The computer system of claim 7, further comprising:

storing the chat history, using a chatbot backend server, within a storage component.

10. The computer system of claim 7, further comprising:

performing statistical computations on the gathered input data to determine preliminary dependencies between the configuration setting parameters on the telemetry data.

11. The computer system of claim 7, wherein determining dependencies between a given parameter from the series of configuration setting parameters and a given resource from a series of resources using the generated machine learning model further comprises:

calculating a score reflecting the dependency between the given parameter and the given resource; and normalizing the calculated score.

12. The computer system of claim 7, further comprising:

outputting the predicted performance outcomes to a user via a user interface.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

gathering input data for a target system, the input data including configuration settings data, a series of configuration setting parameters, and telemetry data;

leveraging analysis of variance (ANOVA) techniques to determine if the telemetry data may be drawn from a same population;

generating, from the input data, a machine learning model configured to process network data and the configuration settings data from the target system;

determining dependencies between a given parameter from the series of configuration setting parameters and a given resource from a series of resources using the generated machine learning model;

predicting, using the generated machine learning model, and based on the determined dependencies, performance outcomes under a tuneable range of the series of configuration setting parameters; and generalizing the machine learning model across a plurality of secondary systems.

14. The computer program product of claim 13, performing entity analysis on the gathered input data to determine a proportion of setting types.

15. The computer program product of claim 13, further comprising:

storing the chat history, using a chatbot backend server, within a storage component.

16. The computer program product of claim 13, further comprising:

performing statistical computations on the gathered input data to determine preliminary dependencies between the configuration setting parameters on the telemetry data.

17. The computer program product of claim 16, wherein determining dependencies between a given parameter from the series of configuration setting parameters and a given resource from a series of resources using the generated machine learning model further comprises:

calculating a score reflecting the dependency between the given parameter and the given resource; and normalizing the calculated score.

* * * * *